US010903909B2

(12) United States Patent
Campos et al.

(10) Patent No.: US 10,903,909 B2
(45) Date of Patent: Jan. 26, 2021

(54) SYSTEM AND METHODS FOR CABLE FIBER NODE SPLITTING USING COHERENT OPTICS

(71) Applicant: CABLE TELEVISION LABORATORIES, INC., Louisville, CO (US)

(72) Inventors: Luis Alberto Campos, Superior, CO (US); Zhensheng Jia, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 16/700,840

(22) Filed: Dec. 2, 2019

(65) Prior Publication Data

US 2020/0106528 A1  Apr. 2, 2020

Related U.S. Application Data

(62) Division of application No. 15/847,535, filed on Dec. 19, 2017, now Pat. No. 10,498,456.

(Continued)

(51) Int. Cl.
*H04J 14/06* (2006.01)
*H04B 10/532* (2013.01)
(Continued)

(52) U.S. Cl.
CPC .......... *H04B 10/532* (2013.01); *H04B 10/25* (2013.01); *H04B 10/2575* (2013.01); *H04B 10/503* (2013.01); *H04B 10/505* (2013.01); *H04B 10/61* (2013.01); *H04B 10/614* (2013.01); *H04B 10/65* (2020.05); *H04J 14/06* (2013.01)

(58) Field of Classification Search
CPC .... H04B 10/532; H04B 10/503; H04B 10/25; H04B 10/61; H04J 14/06
See application file for complete search history.

(56) References Cited

U.S. PATENT DOCUMENTS

2013/0330070 A1\* 12/2013 Yu ...................... H04B 10/2507
398/16
2014/0023368 A1\* 1/2014 Bhandare ................ H04J 14/06
398/65

(Continued)

*Primary Examiner* — Dzung D Tran
(74) *Attorney, Agent, or Firm* — Armstrong Teasdale LLP

(57) ABSTRACT

A coherent optical transmitter is in operable communication with an optical fiber an includes a plurality of analog-to-digital converters (ADCs) configured to (i) receive a plurality of radio frequency analog input signals, respectively, and (ii) convert the received plurality of RF analog input signals into a plurality of respective digital data streams. The transmitter further includes a source laser configured to output at least two orthogonal polarization component signals, and at least two polarization modulators configured to modulate (i) an in-phase portion output from a first ADC, (ii) an in-quadrature portion output from a second ADC, and (iii) one polarization component signal of the at least two orthogonal polarization component signals. The transmitter further includes a polarization beam combiner configured to (i) multiplex the respective outputs of the at least two polarization modulators, and (ii) transmit the multiplexed output from the polarization beam combiner to the optical fiber.

16 Claims, 6 Drawing Sheets

Related U.S. Application Data

(60) Provisional application No. 62/435,971, filed on Dec. 19, 2016.

(51) Int. Cl.
*H04B 10/50* (2013.01)
*H04B 10/25* (2013.01)
*H04B 10/61* (2013.01)
*H04B 10/2575* (2013.01)

(56) References Cited

U.S. PATENT DOCUMENTS

| | | |
|---|---|---|
| 2015/0050030 A1* | 2/2015 | Le Taillandier De Gabory .......... H04B 10/50595 398/183 |
| 2016/0323040 A1 | 11/2016 | Wood |
| 2017/0244489 A1* | 8/2017 | Zhuge .................... H04B 10/40 |
| 2017/0250776 A1* | 8/2017 | Morsy-Osman ..... H04B 10/532 |

* cited by examiner

SYSTEM AND METHODS FOR CABLE FIBER NODE SPLITTING USING COHERENT OPTICS

CROSS REFERENCE TO RELATED APPLICATIONS

This application is a divisional application of U.S. Non-provisional application Ser. No. 15/847,535, filed Dec. 19, 2017, which application claims the benefit of and priority to U.S. Provisional Patent Application Ser. No. 62/435,971, filed Dec. 19, 2016, which is incorporated herein by reference in its entirety.

BACKGROUND

The field of the disclosure relates generally to fiber communication networks, and more particularly, to access node transmission techniques for communication networks capable of transmitting coherent optical signals.

Fiber-based cable networks have been widely deployed in many regions of the world. Increasing demand for high-speed data and video services is presently driving growth in access bandwidth requirements for both residential offerings and for business subscribers. The amount of fiber resources available to such conventional networks, however, has remained fixed. A number of multiplexing approaches have been conventionally implemented to support the growing demand on the cable networks, using the available fiber resources. One presently popular approach uses wavelength division multiplexing (WDM). The RF cable spectrum is carried over a fiber by subcarrier multiplexing (SCM) the data and video channels over an optical carrier that (i) is intensity-modulated, (ii) uses a directly-modulated laser, or (iii) uses external modulation. The optical signals of these multiplexed optical carriers require a very high signal-to-noise ratio (SNR) to carry the high quality cable RF signals.

To achieve the required high dynamic range necessary for the high SNR, transmission lasers at the hub of the operator are required to operate at very high power levels, which is both difficult and expensive to implement in practice. A recent approach to achieve this high SNR requirement digitizes the RF signal and carries the digitized signal through the optical digital transport, as disclosed in co-pending U.S. application Ser. No. 15/847,417, filed on Dec. 19, 2017, the disclosure of which is incorporated by reference herein.

FIG. 1 is a schematic illustration of a conventional cable network 100 operable to provide video, voice, and data services to subscribers. Cable network 100 includes a hub 102, a node 104, and end users 106 (e.g., residential users 106(1), business users 106(2), cellular base stations 106(3), etc.). A long fiber 108 carries digital optical signals and or digitized RF signals between hub 102 and fiber node 104. In some embodiments, an electrical-to-optical (E/O) modulator 110 is disposed between hub 102 and long fiber 108. Respective end users 106 are disposed along a plurality of short fiber segments 112 (four short fiber segments 112 illustrated in FIG. 1), which are divided at node 104 by a plurality of sub-nodes 114. Such sub-node splitting techniques are running out of capacity to meet the growing demand for bandwidth over existing long fibers 108. Accordingly, improved techniques are needed to effectively split a node into independent streams, in order to provide additional capacity to a segment of the node without significantly increasing an outlay of fiber resources.

BRIEF SUMMARY

In an embodiment, a coherent optical transmitter is in operable communication with at least one optical fiber. The optical transmitter includes a plurality of analog-to-digital converters (ADCs) configured to (i) receive a plurality of radio frequency (RF) analog input signals, respectively, and (ii) convert the received plurality of RF analog input signals into a plurality of respective digital data streams. The optical transmitter further includes a source laser configured to output at least two orthogonal polarization component signals, and at least two polarization modulators configured to modulate (i) an in-phase (I) portion output from a first ADC of the plurality of ADCs, (ii) an in-quadrature portion output from a second ADC of the plurality of ADCs, and (iii) one polarization component signal of the at least two orthogonal polarization component signals. The optical transmitter also includes a polarization beam combiner configured to (i) multiplex the respective outputs of the at least two polarization modulators, and (ii) transmit the multiplexed output from the polarization beam combiner to the at least one optical fiber.

In an embodiment, an optical network system is provided. The system includes an optical hub configured to receive at least four separate input signals. The optical hub includes (i) a source laser outputting orthogonal X-polarization and Y-polarization signals, (ii) an X-polarization modulator, (iii) a Y-polarization modulator, and (iv) a polarization beam combiner. The system further includes an optical fiber in operable communication with an output of the polarization beam combiner at a first end of the optical fiber, and a fiber node in operable communication with a second end of the optical fiber. The fiber node is configured to demodulate a multiplexed digitized signal from the optical fiber into at least four separate output signals corresponding respectively to the at least four separate input signals. The X-polarization modulator is configured to modulate (i) an in-phase portion of a first of the four separate input signals with the X-polarization signal, (ii) an in-quadrature portion of a second of the four separate input signals with the X-polarization signal, (iii) an in-phase portion of a third of the four separate input signals with the Y-polarization signal, (ii) an in-quadrature portion of a fourth of the four separate input signals with the Y-polarization signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

According to the embodiments described herein, advantageous techniques for cable fiber node splitting implement digitization of RF signals multiplexed over a single coherent optical carrier. That is, the systems and methods herein utilize multiplexing and demultiplexing processes for digital transmissions over a single optical carrier. The novel and advantageous techniques herein leverage the natural functional separation of data streams from coherent optics and RF digitization schemes. Specifically, the present embodiments provide a novel approach to utilize the functionality of a polarization multiplexed coherent optical link, which, as implemented herein, contains a natural signal division into at least four separate streams. This novel approach efficiently splits the signal at the fiber node, while simultaneously solving the SNR challenges presented by conventional systems. The present embodiments further provide additional novel mechanisms and techniques that allow for greater flexibility in data rate scaling per node, or per service area.

Figure 2:
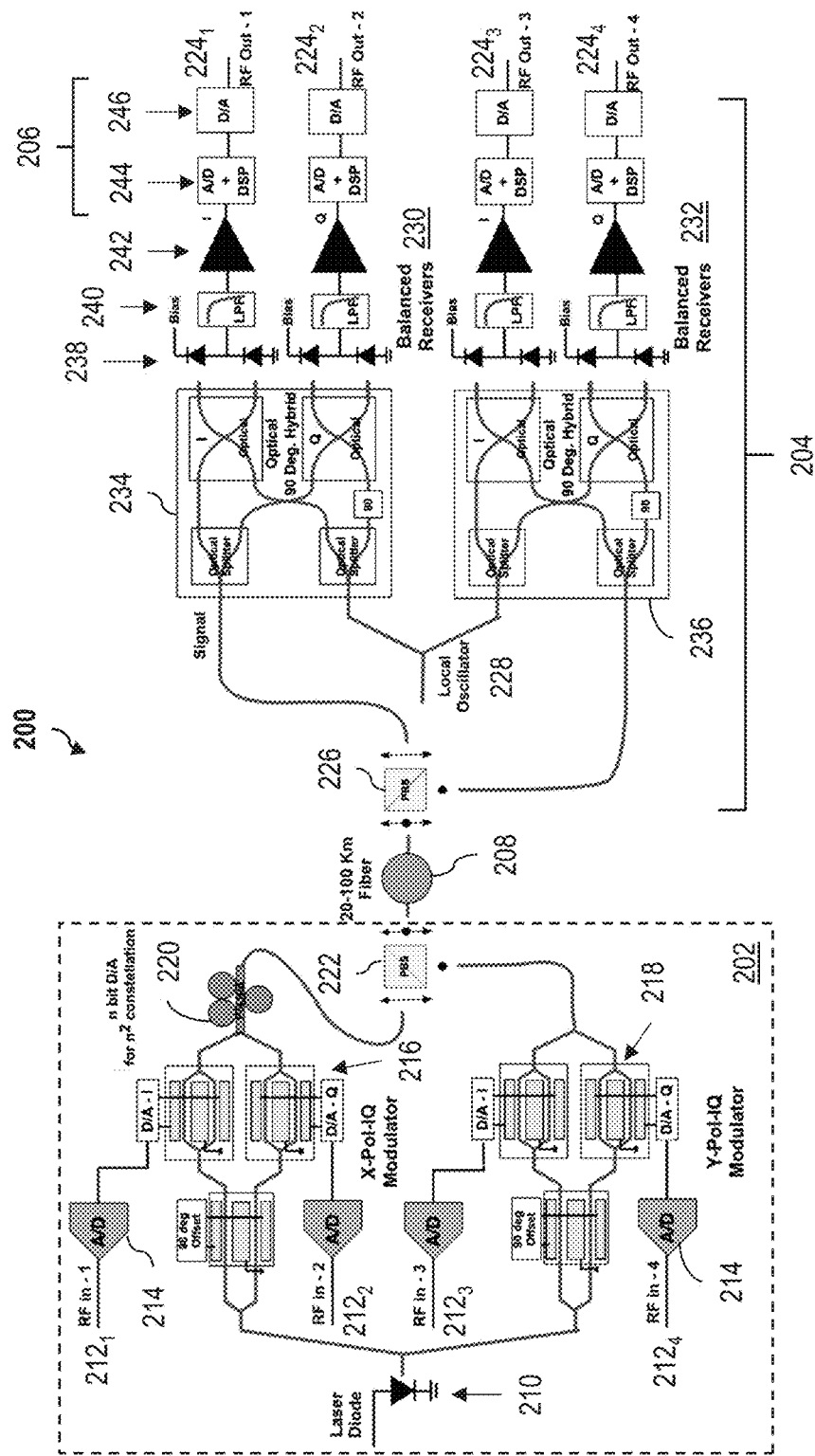
FIG. 2 is a schematic illustration of an exemplary optical link utilizing a polarization multiplexed coherent link, according to an embodiment.

FIG. 2 is a schematic illustration of an exemplary optical link 200 utilizing a polarization multiplexed coherent link. As described above, a polarization multiplexed coherent link may be efficiently split into a natural signal division of four separate streams, namely, an in-phase (I) signal and an in-quadrature (Q) signal, and for each of two orthogonal X- and Y-polarizations. Each of these four digital data streams may then carry the RF digitized spectrum of a cable signal.

In the exemplary embodiment, optical link 200 includes an optical hub 202, a fiber node 204, end users 206, and at least one optical fiber 208 for transporting optical signals between optical hub 202 and fiber node 204. In the embodiment illustrated in FIG. 2, optical fiber 208 may represent a length of approximately between 20 km and 100 km. Exemplary hub and optical link architectures are further described in detail in co-pending U.S. patent application Ser. No. 15/283,632, filed Oct. 3, 2016, and co-pending U.S. patent application Ser. No. 15/590,464, filed May 9, 2017, the disclosures of both such co-pending applications being incorporated by reference herein.

In the exemplary embodiment, optical hub 202 includes at least one source laser 210, which may include a laser diode. Optical hub 202 receives a plurality of input RF analog signals 212 (four input signals 2121-2124 illustrated in this example), which are converted into digital signals by a plurality of respective analog-to-digital (A/D) converters 214. That is, each of the input RF analog signals 212 is digitized by the respective A/D converter 214, which has enough bits per sample such that the required carrier-to-noise ratio (CNR) of the most demanding channel in the RF spectrum can be accommodated. For example, 4096 QAM channels in an RF spectrum require a SNR greater than 41 dB, (e.g., according to the DOCSIS 3.1 PHY specification).

In the exemplary embodiment, optical hub 202 includes a first polarization modulator 216 and a second polarization modulator 218. In an exemplary embodiment, first and second polarization modulators 216, 218 represent dual-carrier dual-polarization (DP) in-phase-and-quadrature IQ modulators. In this example, first polarization modulator 216 modulates the X-polarization from laser 210, while second polarization modulator 218 modulates the Y-polarization (also from laser 210) that is orthogonal to the X-polarization, with both of the respective orthogonal polarizations being further modulated with the respective digital signals output from A/D converters 214. In at least one embodiment, one or both of first and second polarization modulators 216, 218 includes an n-bit digital-to-analog (D/A) converter for an $n^2$ constellation. In the exemplary embodiment, a polarization rotator 220 rotates the polarization axis of the signal output from first polarization modulator 216, and this rotated signal output is combined with the signal output from second polarization modulator 218 by a polarization beam splitter/combiner 222, which provides the combined signal to optical fiber 208.

Figure 1:
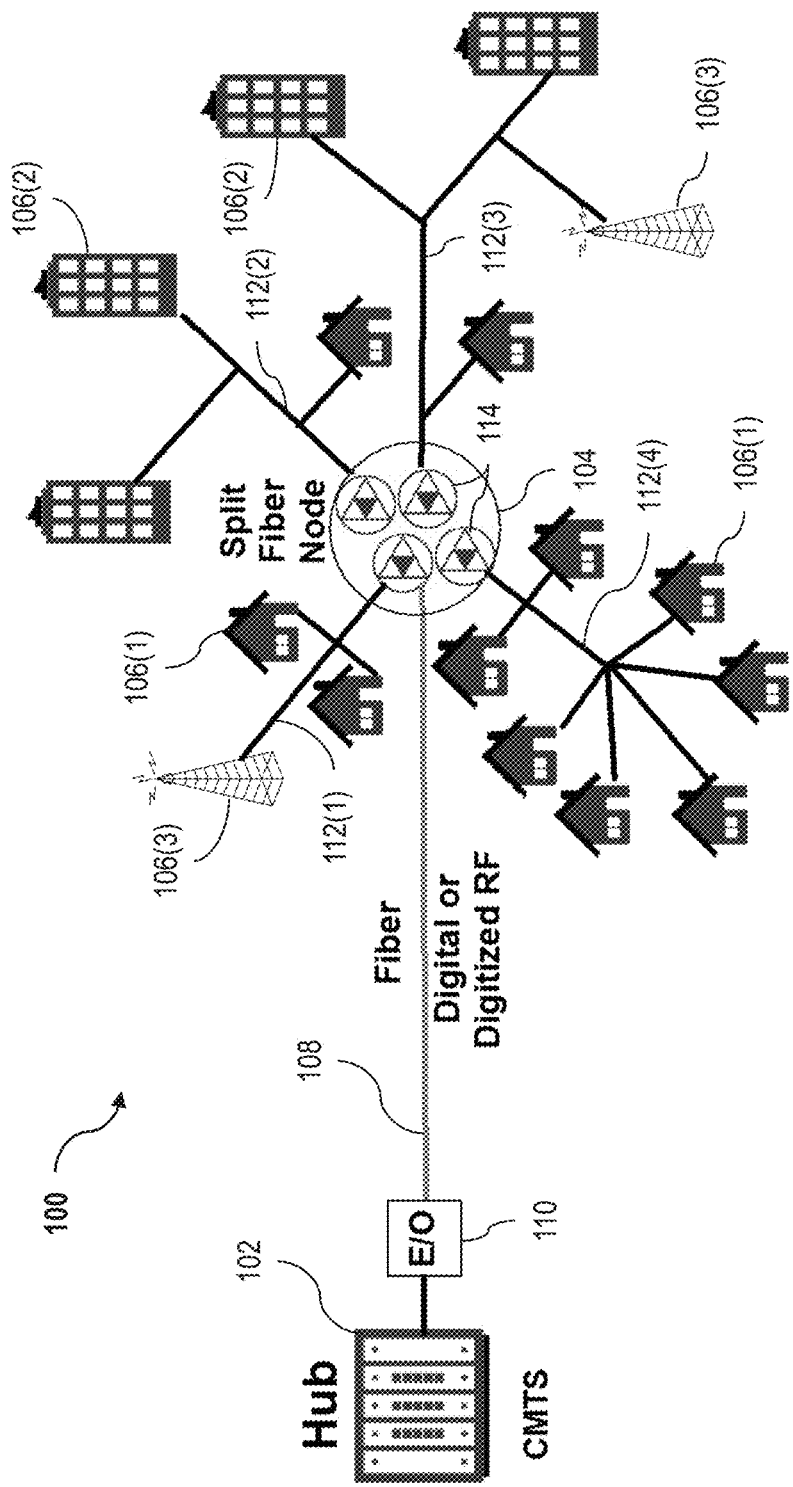
FIG. 1 is a schematic illustration of a conventional cable network.

Further in the exemplary embodiment, fiber node 204 receives the combined signal (i.e., carrying the four individual modulated data streams) from optical fiber 208, converts the data streams recovered therefrom into the original RF analog signals, and directs the recovered analog signals to a respective RF port 224 (four RF ports 2241-2244 illustrated in this example) for transport to an individual fiber segment (e.g., fiber segment 112, FIG. 1) or end user 206. That is, fiber node 204 functions in this example as an active receiver to recover the respective individual data streams, in contrast to conventional fiber nodes which typically include only passive optical components, and require that active signal processing be performed by the electronic components of an end user receiver (e.g., customer premises equipment (CPE), optical network unit (ONU), optical network terminal (ONT), cable modem (CM), etc.).

In operation of fiber node 204, the received combined signal from optical fiber 208 is split into respective orthogonal components by a polarization beam splitter/combiner 226, and combined with a signal from a local oscillator 228 at both of a first balanced receiver 230 and a second balanced receiver 232. First and second balanced receivers 230, 232 include first optics 234 and second optics 236, respectively, for further splitting, rotating, and combining the various components of the received signals from polarization beam splitter/combiner 226 and local oscillator 228. In the exemplary embodiment, balanced receivers 230, 232 each further include one or more of the following components: a biasing unit 238; a low-pass filter 240; an amplifier 242; an A/D converter and digital signal processor (DSP) 244; and a D/A converter 246. In some embodiments, A/D conversion, digital signal processing, and D/A conversion is alternatively, or additionally, performed by end user 206 (e.g., by an end user receiver or CPE).

According to the advantageous architecture of digital optical link 200, digitized RF signals from hub 202 may be multiplexed over a single wavelength to fiber node 204. By multiplexing a single wavelength, the transmission of the coherent optical signal contained therein may be more easily adjusted in a highly flexible manner. That is, parameters of the coherent signal, such as symbol rate and modulation format, may be adjusted to achieve specific data rates. Furthermore, according to the present embodiments, the same resulting data rate can be achieved according to several different configurations. For example, with two polarizations, a 200 Gbps data rate can be achieved using (i) a 16 QAM modulation format at a 25 Gbaud symbol rate, (ii) a QPSK modulation format at a 50 Gbaud symbol rate, or (iii) a 32 QAM modulation format at a 20 Gbaud symbol rate. The present embodiments therefore provide significant flexibility to enable the optical transport to be optimized as desired, such as for cost or budget concerns.

Figure 3:
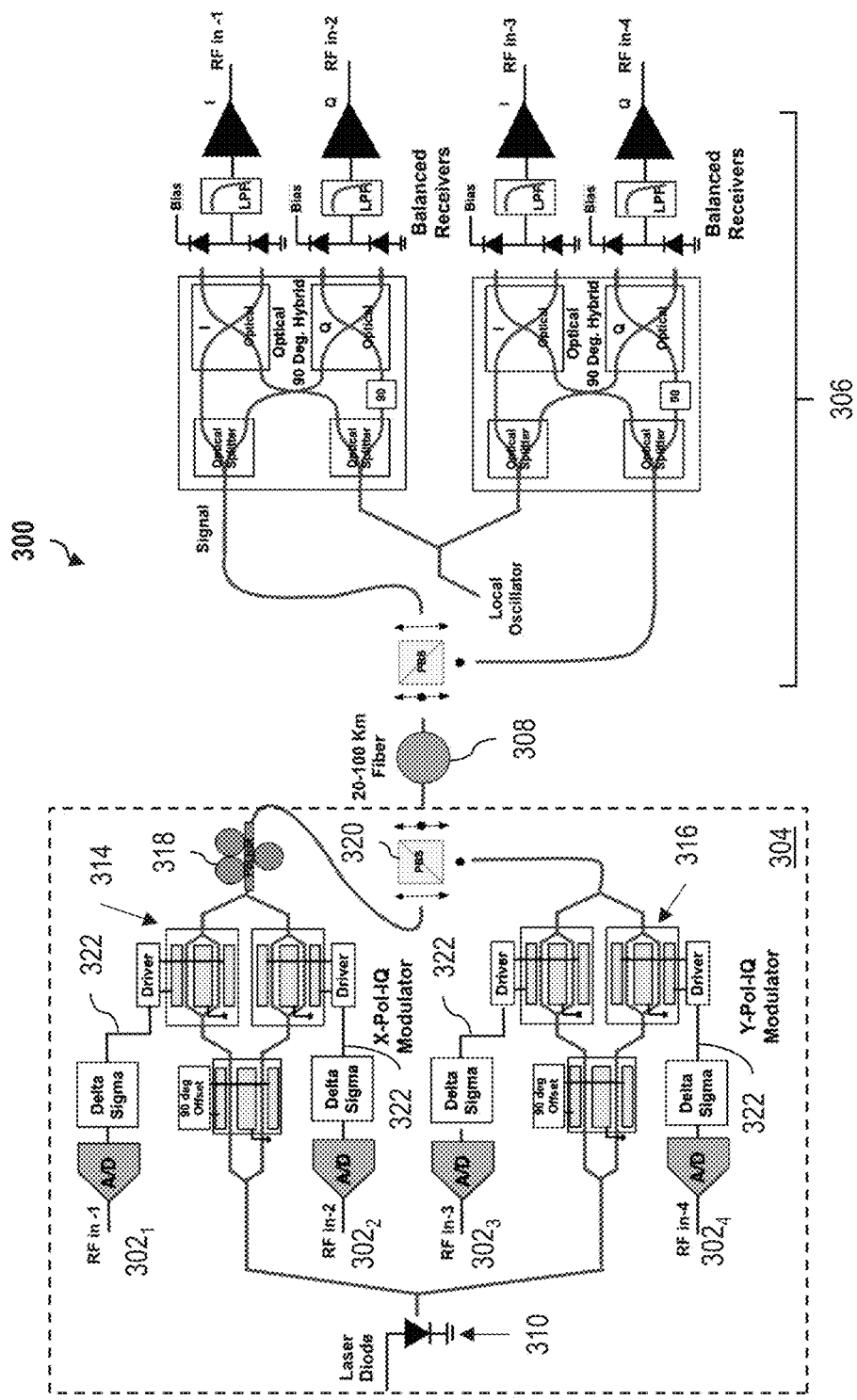
FIG. 3 is a schematic illustration of an exemplary optical link utilizing delta-sigma modulation, according to an embodiment.

FIG. 3 is a schematic illustration of an exemplary optical link 300 utilizing delta-sigma modulation. Optical link 300 is similar to optical link 200, except that optical link 300 digitizes the individual input analog RF signals 302 with delta-sigma modulation prior to modulation of the individual orthogonal components. That is, similar to optical link 200, optical link 300 includes an optical hub 304, a fiber node 306, and an optical fiber 308. Optical hub 304 includes a source laser 310, a plurality of A/D converters 312, a first polarization modulator 314, a second polarization modulator 316, a polarization rotator 318, and a polarization beam splitter/combiner 320. Optical hub 304 differs from optical hub 202, FIG. 2, in that optical hub 304 substitutes a respective delta-sigma modulator/driver 322 for the constellation D/A converter of optical hub 202, as implemented within first and second polarization modulators 314, 316, in accordance with the principles described in co-pending application Ser. No. 15/847,417, filed Dec. 19, 2017.

According to the advantageous architecture of optical link 300, the corresponding receiver architecture of fiber node 306 is greatly simplified. Specifically, by utilizing the delta-sigma modulation techniques described herein, fiber node 306 is able to reduce the quantity of post-amplification hardware components, for example, additional A/D and D/A converters and DSPs. In practice, a cable network will typically include a plurality of receivers downstream from the optical hub, and therefore the reduced hardware complexity on the receiver side of the fiber node will significantly outweigh the increased costs to implement delta-sigma modulation at the transmitter side of the optical hub.

Figure 4:
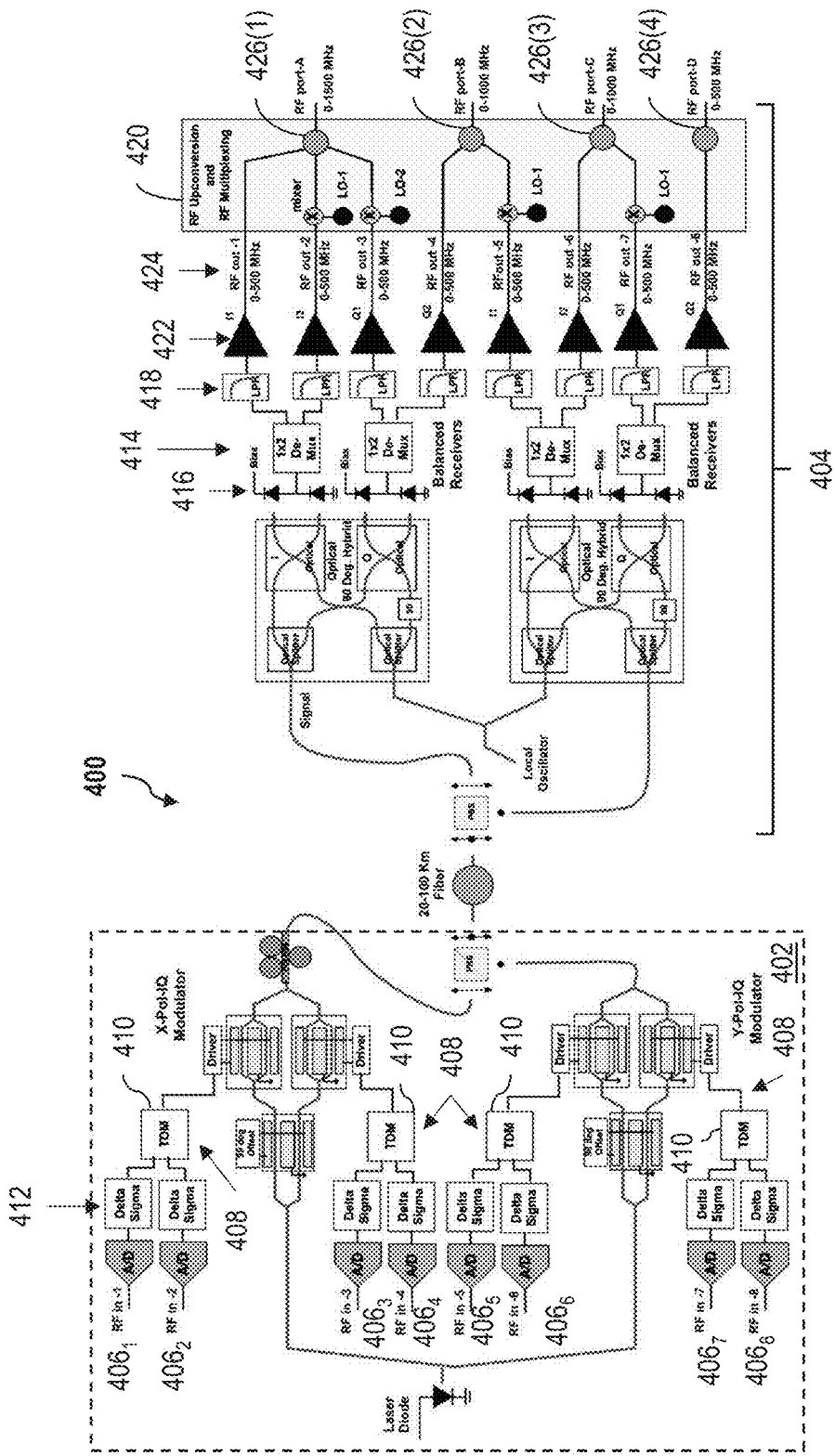
FIG. 4 is a schematic illustration of an exemplary optical link utilizing time division multiplexed delta-sigma modulation, according to an embodiment.

FIG. 4 is a schematic illustration of an exemplary optical link 400 utilizing time division multiplexed delta-sigma modulation. Optical link 400 is similar to optical link 300, and includes an optical hub 402 and a fiber node 404, except that optical hub 402 multiplexes each respective input analog signal 406 (eight in this example) with delta-sigma modulation after digitization, but prior to modulation of the individual orthogonal components. That is, within a respective delta-sigma modulator/driver 408, a time division multiplexer 410 multiplexes the digitized outputs of at least two adjacent delta-sigma modulation portions 412 within the same delta-sigma modulator/driver 408. Other components of optical hub 402 are similar to components of optical hub 304, and are therefore not individually described again with respect to FIG. 4.

According to the advantageous configuration of optical hub 402, each of the individual data streams 406 is digitized and multiplexed so that additional spectrum copies can be generated therefrom. In the conventional systems, a cable fiber node is typically split into a maximum of four coaxial branches (i.e., fiber segments 112, FIG. 1). According to the exemplary architecture depicted in FIG. 4 though, the implementation of 1×2 time division multiplexers 410 advantageously results in the generation of eight separate RF streams. According to this configuration, individual portions of the spectrum are capable of greater granular adjustment according to the quality of the individual signal being carried on the respective stream.

For example, a first portion of a signal spectrum may only require a relatively low CNR, and therefore a lower number of bits per sample will be needed for this first portion of the spectrum. Thus, the number of bits per sample may then be adjusted according to the needs for each separate portion of the transmitted spectrum. That is, a second portion of the spectrum may require a higher CNR, and thus use a greater number of bits per sample, etc. After the eight separate RF streams are recovered at fiber node 404, the recovered streams can be frequency-multiplexed to further adjust to the needs of individual end users/subscribers served by the respective coaxial branch. In at least one embodiment, optical link 400 is implemented with respect to a cellular front-haul application, where each of the (eight) RF streams is utilized for a respective orthogonal MIMO path.

In the exemplary embodiment, fiber node 404 is also similar to fiber node 306, except that fiber node 404 includes a plurality of demultiplexers 414 (each 1×2 in this example) disposed between biasing components 416 and low-pass filters 418. In this example, fiber node 404 further includes an RF up-converter 420 configured to selectively mix respective RF output signals from amplifiers 422, and/or to otherwise perform the spectrum manipulation functionality described above. In the example illustrated in FIG. 4, up-converter 420 frequency-multiplexes and/or mixes three separate 500 MHz output RF bands 424 into a first port branch 424(1) to generate a 1.5 GHz aggregate spectrum directed to that respective port (A). Similarly, up-converter 418 frequency multiplexes/mixes pairs of other separate 500 MHz output RF bands 424 at both of second and third port branches 426(2), 426(3), to generate 1 GHz aggregate spectra at both of RF ports B and C, respectively. Still further in this example, a fourth port branch 426(4) utilizes only a single output RF band 424 to pass through a non-aggregated spectrum of 500 MHz at RF port D. Other components of fiber node 404 are similar to components of fiber node 306, and are therefore not individually described again with respect to FIG. 4.

According to the advantageous architecture of optical link 400, separate RF streams may be manipulated in the frequency domain to generate output RF streams that may have different characteristics from one another. This configuration is of particular usefulness where the transmitted spectrum includes frequency components that do not require the same processing considerations as other portions of the spectrum, even for digitized RF signals multiplexed over a single wavelength. Additionally, although the architecture shown with respect to FIG. 4 is described as using delta-sigma modulation techniques, the additional time domain modulation functionality of optical link 400 may be further adapted for advantageous application in other conventional RF digitization implementations.

Figure 5:
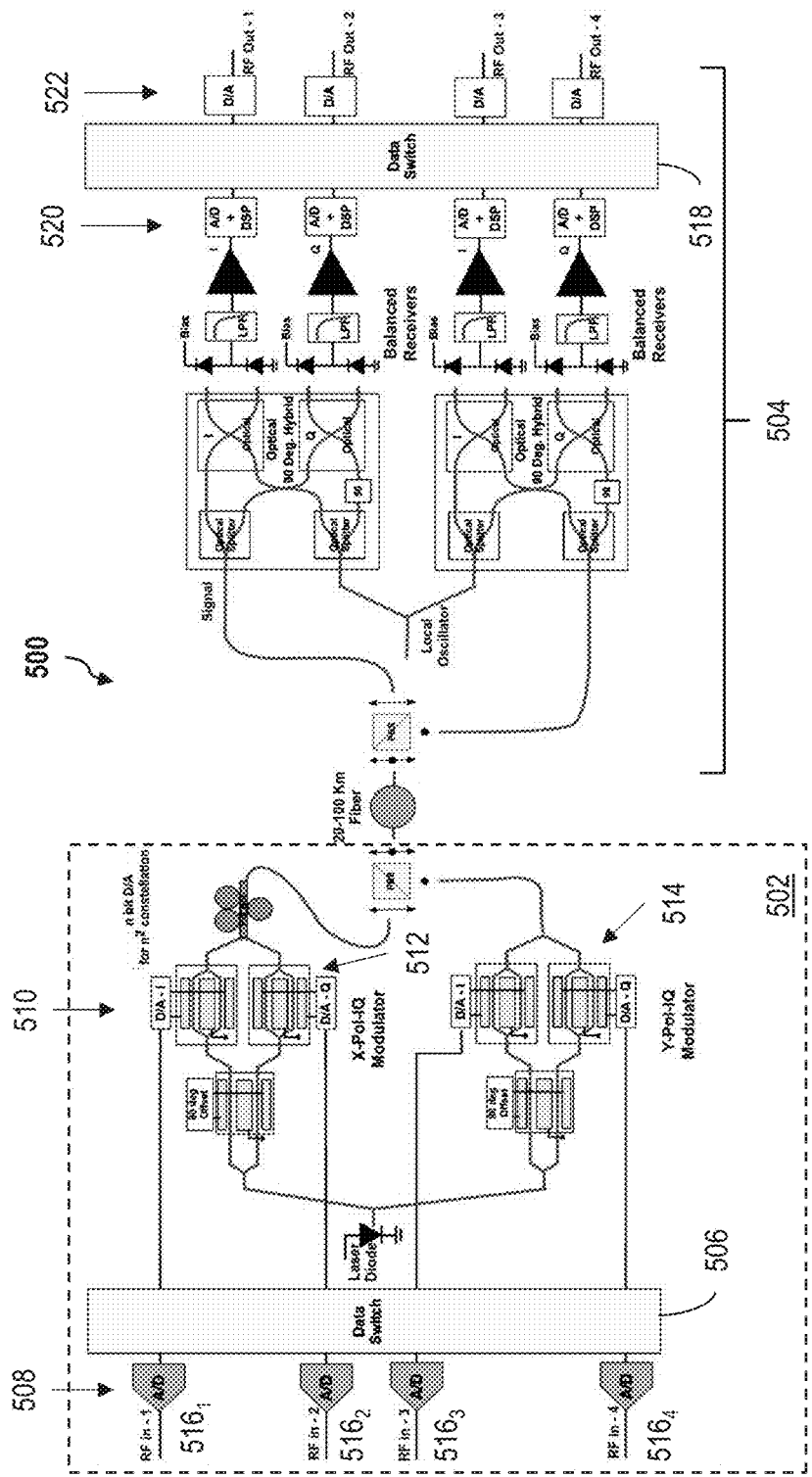
FIG. 5 is a schematic illustration of an exemplary optical link utilizing a polarization multiplexed coherent link for digitized signals of different adaptable sizes, according to an embodiment.

FIG. 5 is a schematic illustration of an exemplary optical link 500 utilizing a polarization multiplexed coherent link for digitized signals of different adaptable sizes. Optical link 500 is similar to optical link 200, and includes an optical hub 502 and a fiber node 504, except that optical hub 502 includes a hub data switch 506 disposed between a plurality of A/D converters 508 and respective constellation D/A converters 510 of first and second polarization modulators 512, 514. Other components of optical hub 502 are similar to components of optical hub 202, FIG. 2, and are not individually described with respect to FIG. 5.

According to the advantageous architecture of optical link 500, input RF streams 516 may be manipulated in the digital domain. That is, in operation, hub data switch 506 uniformly drives the respective coherent I-Q branches in the X- and Y-polarizations, however, the total data passing through optical hub 502 may be flexibly represented by RF signals having different characteristics. Accordingly, fiber node 504 is similar in structure and function to fiber node 204, FIG. 2, except that fiber node 504 includes a node data switch 518 at the receiver end, disposed, for example, between A/D converters/DSPs 520 and D/A converters 522. Noted data switch 518 functions in a complementary fashion with hub data switch 506, and separates the recovered data streams prior to output to respective RF ports. According to this configuration, the output data streams on the receiver side may be separated according to the particular RF input streams that are generated on the transmitter side. The embodiments depicted in FIG. 5 are therefore of particular utility with respect to digitized RF signals having different adaptable sizes, and/or multiplexed over a single wavelength.

Figure 6:
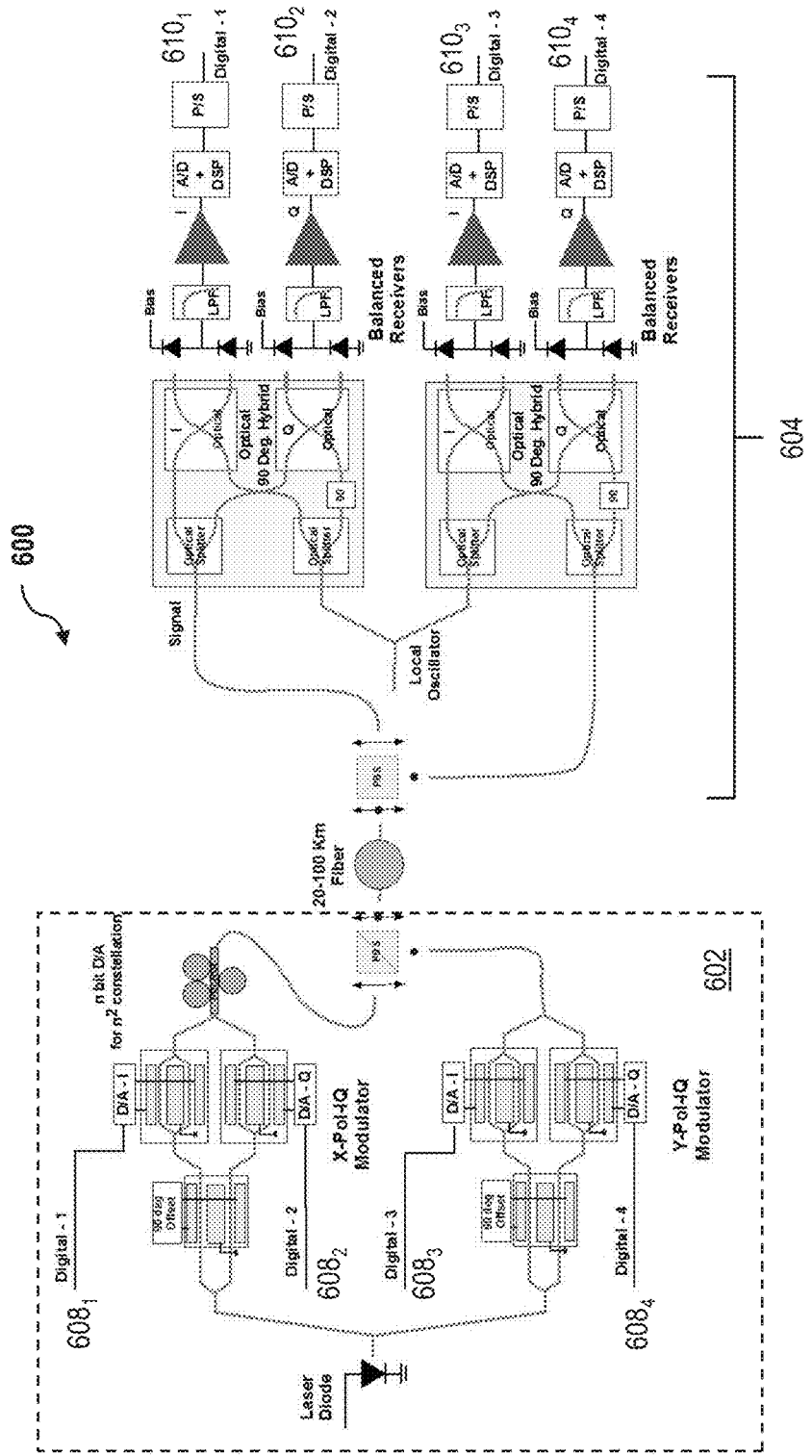
FIG. 6 is a schematic illustration of an exemplary optical link utilizing a polarization multiplexed coherent link for baseband digital signals, according to an embodiment.

FIG. 6 is a schematic illustration of an exemplary optical link utilizing a polarization multiplexed coherent link for baseband digital signals. Optical link 600 is also similar to optical link 200, FIG. 2, and includes an optical hub 602 and a fiber node 604, except that optical hub 602 is configured to receive baseband digital optical signals 606 instead of input RF analog signals. In the example illustrated in FIG. 6, four separate baseband digital signals 608 are multiplexed over a single wavelength at optical hub 602, and then demultiplexed at fiber node 604 into individual data streams 610, which may be then independently fed to individual end-points or targets. The structural components of optical hub 602 and fiber node 604 are otherwise similar to respective components of optical hub 202 and fiber node 204 (FIG. 2), respectively, and are not individually described with respect to FIG. 6.

According to the advantageous architecture of optical link 600, the techniques and embodiments described above are also adaptable to signals received through baseband digital optics technologies. That is, whereas a fiber node according to the above embodiments may be split through RF manipulation techniques, fiber node 604 may similarly be configured to split baseband digital signals. An example of such input baseband digital signals may be encountered with respect to a fiber node constituting remote CMTS, remote MAC&PHY, and/or remote PHY architectures. The embodiments of FIG. 6 are therefore of particular use where it may be advantageous to lower the rates and technology costs by using existing components that connect to high-bandwidth coherent optical transport mechanisms. Through the flexible architecture of optical link 600, rate reduction may be based on natural characteristics of the coherent modulation process, and therefore extraction of the baseband digital stream can be performed with minimal processing. By minimizing the required processing for extraction of the digital stream, latency will be further reduced, as will be the costs to implement and maintain optical link 600.

According to the advantageous systems and methods described above, optical link architectures utilize one or more coherent optics techniques to digitize input analog RF signals or baseband digital signals to more effectively split the signals over separate fiber segments extending from a fiber node. The systems and methods described herein utilize existing fiber infrastructures to increase the capability of the node to expand transport capacity to meet the increasing bandwidth demands from end users. According to the embodiments described herein, future high bandwidth demand may be met utilizing existing network infrastructures, with relatively minimal cost outlay at the optical hub and the fiber nodes. The present systems and methods thus significantly extend the life of existing fiber infrastructures, while more efficiently using existing optical wavelengths. Through the techniques described herein, a fiber communication network will realize significantly increased scalability, and is able to flexibly grow according to increasing demand from users of both cable operators and cellular services.

Exemplary embodiments of node splitting systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments may be implemented and utilized in connection with other access networks utilizing coherent optics, optical hubs, and/or fiber nodes.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical network system, comprising:
an optical hub configured to receive at least four separate input signals, and including (i) a source laser outputting orthogonal X-polarization and Y-polarization signals, (ii) an X-polarization modulator, (iii) a Y-polarization modulator, (iv) a polarization beam combiner, (v) an analog-to-digital converter (ADC) disposed between each of the at least four separate input signals and one of the X-polarization modulator and the Y-polarization modulator, and (vi) a first delta-sigma modulator disposed between each ADC and one of the X-polarization modulator and the Y-polarization modulator;
an optical fiber in operable communication with an output of the polarization beam combiner at a first end of the optical fiber; and
a fiber node in operable communication with a second end of the optical fiber, and configured to demodulate a multiplexed digitized signal from the optical fiber into at least four separate output signals corresponding respectively to the at least four separate input signals,
wherein the X-polarization modulator is configured to modulate (i) an in-phase portion of a first of the at least four separate input signals with the X-polarization signal, (ii) an in-quadrature portion of a second of the at least four separate input signals with the X-polarization signal, (iii) an in-phase portion of a third of the at least four separate input signals with the Y-polarization signal, and (iv) an in-quadrature portion of a fourth of the at least four separate input signals with the Y-polarization signal,
wherein each of the at least four separate input signals comprises a respective input signal pair,
wherein each signal of the respective input signal pair feeds into a separate ADC,
wherein the first delta-sigma modulator is disposed between the ADC corresponding to a first signal of the input signal pair and the respective polarization modulator, and
wherein the optical hub further includes a second delta-sigma modulator disposed between the ADC corresponding to a second signal of the input signal pair and the respective polarization modulator.

2. The system of claim 1, wherein the at least four separate input signals comprise analog RF signals or digital baseband signals.

3. The system of claim 1, wherein the fiber node further includes an up-converter configured to aggregate one or more output bands corresponding respectively to one or more of the eight input signals of the input signal pairs.

4. The system of claim 3, wherein the optical hub further includes a time domain multiplexer disposed between the first and second delta-sigma modulator pair and the respective polarization modulator.

5. The system of claim 1, wherein the polarization beam combiner is configured to (i) multiplex the respective outputs of the X-polarization modulator and the Y-polarization modulator, and (ii) transmit a multiplexed output from the polarization beam combiner to the optical fiber.

6. The system of claim 5, further comprising a polarization rotator disposed between an output from the X-polarization modulator and an input to the polarization beam combiner.

7. The system of claim 1, wherein the source laser comprises a laser diode.

8. An optical network system, comprising:
an optical hub configured to receive at least four separate input signals, and including (i) a source laser outputting orthogonal X-polarization and Y-polarization signals, (ii) an X-polarization modulator, (iii) a Y-polarization modulator, (iv) a polarization beam combiner, and (v) an analog-to-digital converter (ADC) disposed between each of the at least four separate input signals and one of the X-polarization modulator and the Y-polarization modulator;
an optical fiber in operable communication with an output of the polarization beam combiner at a first end of the optical fiber; and
a fiber node in operable communication with a second end of the optical fiber, and configured to demodulate a multiplexed digitized signal from the optical fiber into at least four separate output signals corresponding respectively to the at least four separate input signals,
wherein the X-polarization modulator is configured to modulate (i) an in-phase portion of a first of the at least four separate input signals with the X-polarization signal, (ii) an in-quadrature portion of a second of the at least four separate input signals with the X-polarization signal, (iii) an in-phase portion of a third of the at least four separate input signals with the Y-polarization signal, (ii) an in-quadrature portion of a fourth of the at least four separate input signals with the Y-polarization signal,
wherein each of the X-polarization modulator and the Y-polarization modulator includes a constellation digital-to-analog converter (DAC) disposed between an output of each ADC and the respective polarization modulator, and
wherein the optical hub further includes a hub data switch disposed between the output of each ADC and an input to the respective constellation DAC.

9. The system of claim 8, wherein the fiber node further includes, for each of the four separate output signals, a digital signal processor and an output DAC.

10. The system of claim 9, wherein the fiber node further includes a node data switch disposed between the digital signal processors and the output DACs.

11. The system of claim 8, wherein the constellation DAC is configured to perform n-bit conversion for an $n^2$ constellation.

12. The system of claim 8, wherein the polarization beam combiner is configured to (i) multiplex the respective outputs of the X-polarization modulator and the Y-polarization modulator, and (ii) transmit a multiplexed output from the polarization beam combiner to the optical fiber.

13. The system of claim 12, further comprising a polarization rotator disposed between an output from the X-polarization modulator and an input to the polarization beam combiner.

14. The system of claim 8, wherein the source laser comprises a laser diode.

15. The system of claim 8, wherein the fiber node further includes an up-converter configured to aggregate one or more output bands corresponding respectively to one or more of the at least four separate input signals.

16. The system of claim 15, wherein the optical hub further includes a time domain multiplexer disposed between the first and second delta-sigma modulator pair and the respective polarization modulator.

* * * * *